(12) United States Patent  
Yokoyama et al.

(10) Patent No.: US 12,380,776 B2
(45) Date of Patent: Aug. 5, 2025

(54) INFORMATION PROCESSING DEVICE FOR MIXING HAPTIC SIGNALS

(71) Applicant: SONY GROUP CORPORATION, Tokyo (JP)

(72) Inventors: Ryo Yokoyama, Tokyo (JP); Yusuke Nakagawa, Tokyo (JP); Ikuo Yamano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 365 days.

(21) Appl. No.: 17/904,250

(22) PCT Filed: Jan. 6, 2021

(86) PCT No.: PCT/JP2021/000234
§ 371 (c)(1),
(2) Date: Feb. 14, 2023

(87) PCT Pub. No.: WO2021/171791
PCT Pub. Date: Sep. 2, 2021

(65) Prior Publication Data

US 2023/0186738 A1 Jun. 15, 2023

(30) Foreign Application Priority Data

Feb. 25, 2020 (JP) ................................. 2020-029937

(51) Int. Cl.
*G08B 6/00* (2006.01)
*G06F 3/16* (2006.01)
(52) U.S. Cl.
CPC ............... *G08B 6/00* (2013.01); *G06F 3/165* (2013.01)

(58) Field of Classification Search
CPC .................................. G08B 6/00; G06F 3/165
USPC ......................................................... 340/407.1
See application file for complete search history.

(56) References Cited

U.S. PATENT DOCUMENTS

| 10,238,964 B2 * | 3/2019 | Komori .................... A63F 13/28 |
| 2007/0242040 A1* | 10/2007 | Ullrich ..................... G10L 21/06 |
| | | 345/157 |
| 2012/0206247 A1* | 8/2012 | Bhatia ..................... G09G 5/006 |
| | | 340/407.1 |

(Continued)

FOREIGN PATENT DOCUMENTS

| JP | 2015-053037 A | 3/2015 |
| JP | 2015-521328 A | 7/2015 |

(Continued)

OTHER PUBLICATIONS

International Search Report and Written Opinion of PCT Application No. PCT/JP2021/000234, issued on Mar. 16, 2021, 10 pages of ISRWO.

*Primary Examiner* — Kam Wan Ma
(74) *Attorney, Agent, or Firm* — CHIP LAW GROUP

(57) ABSTRACT

A haptic signal can be generated using an intermediate state of a plurality of generation algorithms. A plurality of haptic signal generation units that generates haptic signals using generation algorithms different from each other on the basis of a sound signal by the plurality of haptic signal generation units is included. A mixing unit mixes haptic signals generated by at least two of the plurality of haptic signal generation units to obtain an output haptic signal. For example, a control unit that controls mixing ratios of the mixing unit is further included.

17 Claims, 25 Drawing Sheets

(56) References Cited

U.S. PATENT DOCUMENTS

2015/0070260 A1* 3/2015 Saboune ................ G10L 21/16
345/156

FOREIGN PATENT DOCUMENTS

| JP | 2018-106599 A | 7/2018 |
| JP | 2019-036312 A | 3/2019 |
| WO | 2019/163283 A1 | 8/2019 |
| WO | 2019/220758 A1 | 11/2019 |

* cited by examiner

FIG. 4A
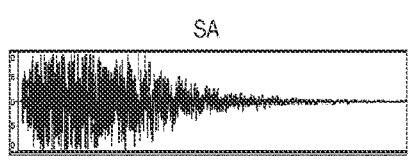
SA
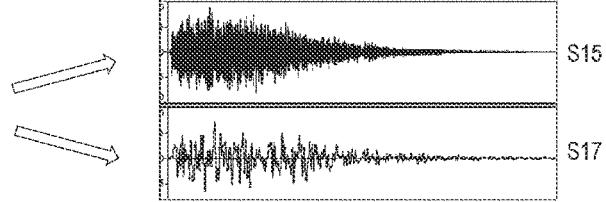
S15
S17
FIG. 4B
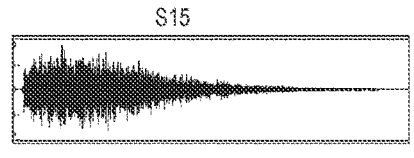
S15
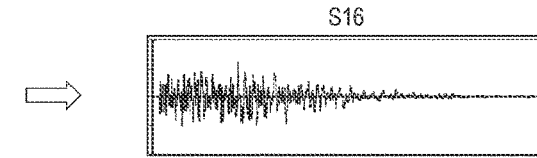
S16
FIG. 4C
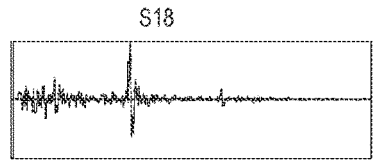
S18
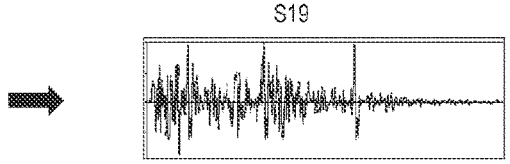
S19

FIG. 9
UI SCREEN FOR MIXING PARAMETER ADJUSTMENT
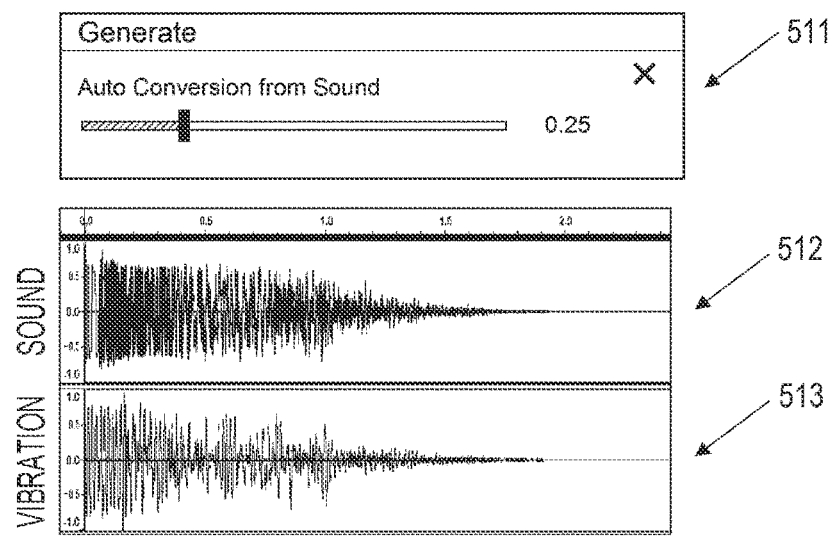
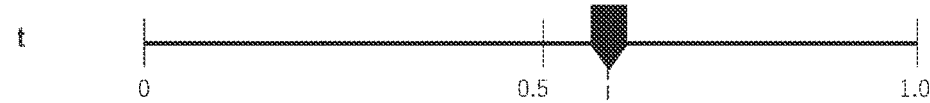
FIG. 10A    t
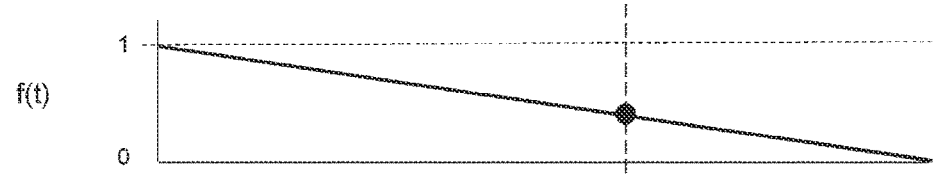
FIG. 10B    f(t)
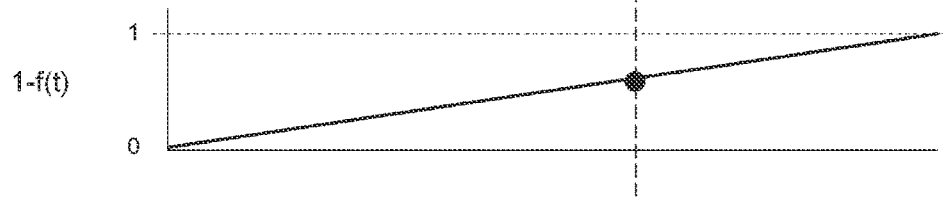
FIG. 10C    1-f(t)

FIG. 11A    t
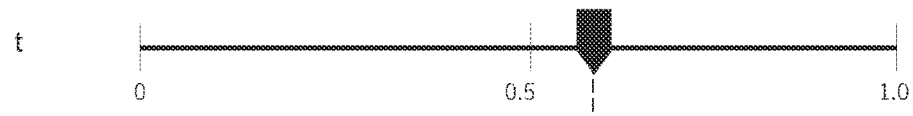
FIG. 11B    f(t)
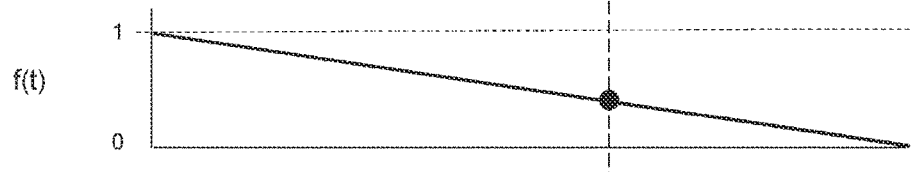
FIG. 11C    1-f(t)
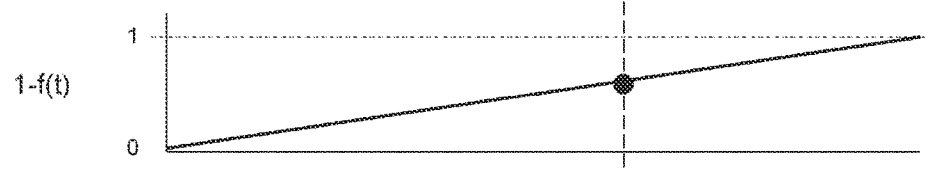
FIG. 11D    INTERNAL PARAMETER
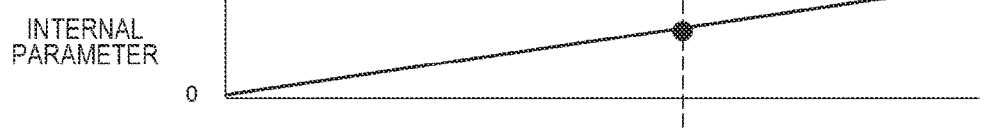

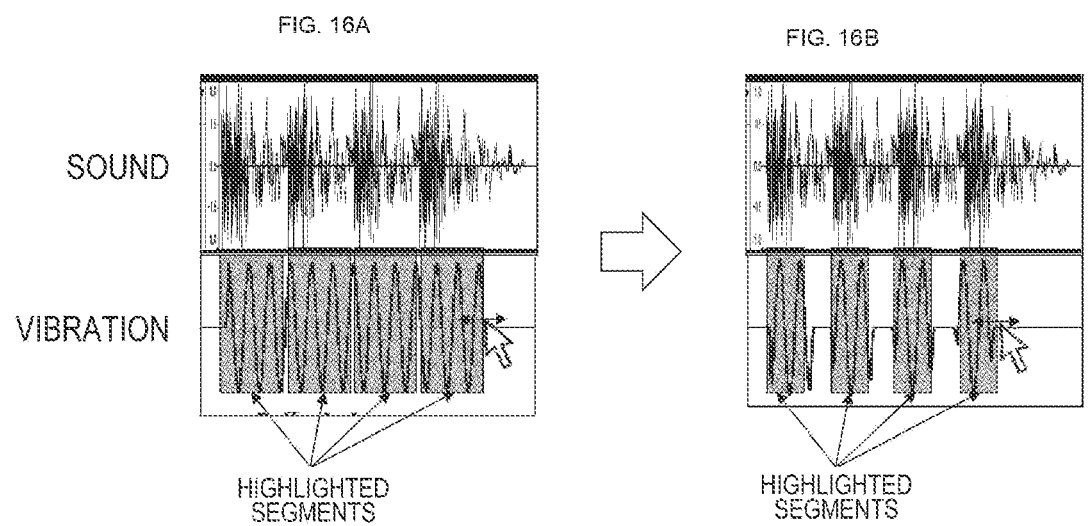

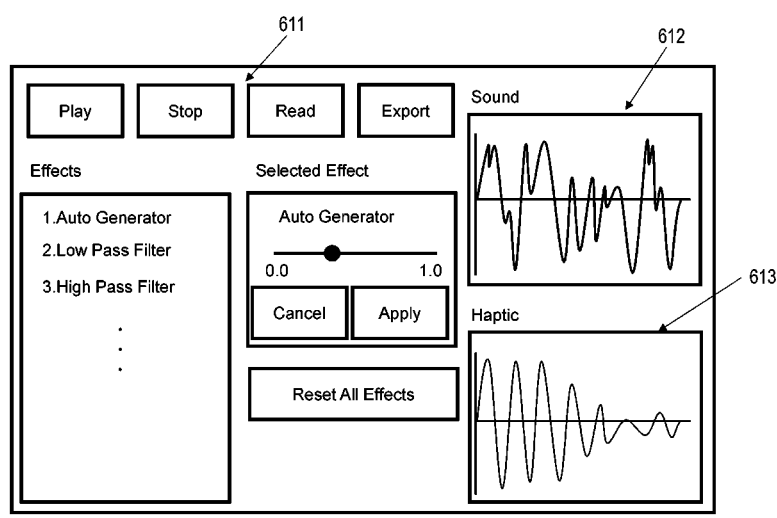

FIG. 25A  SA 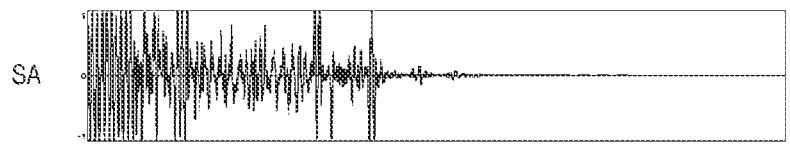
FIG. 25B  MIXING RATIO 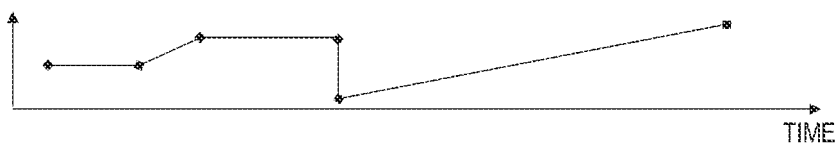
TIME

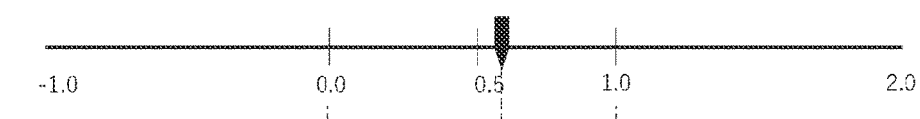
FIG. 26A
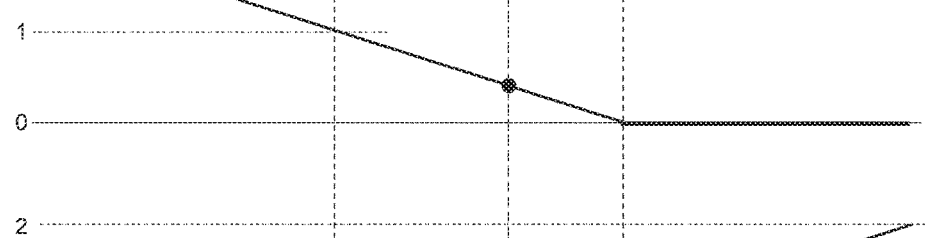
FIG. 26B  f(t)
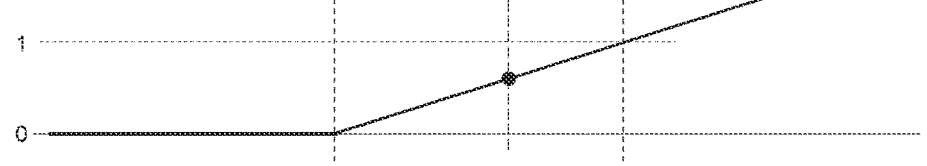
FIG. 26C  1-f(t)

INFORMATION PROCESSING DEVICE FOR MIXING HAPTIC SIGNALS

CROSS REFERENCE TO RELATED APPLICATIONS

This application is a U.S. National Phase of International Patent Application No. PCT/JP2021/000234 filed on Jan. 6, 2021, which claims priority benefit of Japanese Patent Application No. JP 2020-029937 filed in the Japan Patent Office on Feb. 25, 2020. Each of the above-referenced applications is hereby incorporated herein by reference in its entirety.

TECHNICAL FIELD

The present technology relates to an information processing device and an information processing method, and more particularly, relates to an information signal processing device and the like for obtaining a haptic signal.

BACKGROUND ART

Conventionally, for example, a technique used for generating a vibration signal as a haptic signal on the basis of a sound signal has been proposed (see Patent Document 1). The feature of a vibration waveform desired to be achieved varies depending on a production policy. A general-purpose generation algorithm is often optimized for one production policy, and thus, generating a vibration signal reflecting various production policies using a general-purpose generation algorithm is difficult.

CITATION LIST

Patent Document

Patent Document 1: WO 2019/163283 A

SUMMARY OF THE INVENTION

Problems to be Solved by the Invention

An object of the present technology is to enable generation of a haptic signal using an intermediate state of a plurality of generation algorithms.

Solutions to Problems

A concept of the present technology is
an information processing device including
a plurality of haptic signal generation units that generates haptic signals using generation algorithms different from each other, and
a mixing unit that mixes haptic signals generated by at least two of the plurality of haptic signal generation units to obtain an output haptic signal.

In the present technology, a plurality of haptic signal generation units generates haptic signals using generation algorithms different from each other. For example, the plurality of haptic signal generation units generates haptic signals on the basis of a sound signal. A mixing unit mixes the haptic signals generated by at least two of the plurality of haptic signal generation units to obtain an output haptic signal.

As described above, in the present technology, the plurality of haptic signal generation units mixes haptic signals using generation algorithms different from each other to obtain an output haptic signal. Therefore, a haptic signal can be generated using an intermediate state of a plurality of generation algorithms.

Note that, in the present technology, for example, a control unit that controls mixing ratios in the mixing unit may be further included. By the mixing ratios being controlled, a haptic signal can be generated using a more appropriate intermediate state of a plurality of generation algorithms. In this case, for example, the control unit may control the mixing ratios to preset values. Furthermore, in this case, for example, the control unit may control the mixing ratios to values according to a mixing parameter by user operation.

Furthermore, in this case, for example, the control unit may control the mixing ratios to values according to the characteristic of a haptic device that presents haptic sensation by the output haptic signal. Furthermore, in this case, for example, the control unit may control the mixing ratios to values according to the category of the sound signal. For example, in a case where there are values set by user operation in the past for the category of the sound signal, the control unit may control the mixing ratios to said values.

Furthermore, in this case, for example, the control unit may control the mixing ratios in time series. For example, the control unit may control the mixing ratios in time series on the basis of, for example, preset key frames. Furthermore, in this case, for example, the control unit may control the mixing ratios to values according to environmental information. Furthermore, in this case, for example, the control unit may control the mixing ratios to values according to user situational information. Furthermore, in this case, for example, the control unit may control the mixing ratios to values selected by user operation from a plurality of held values.

Furthermore, in this case, for example, the control unit may further control selection of the plurality of haptic signal generation units related to mixing of haptic signals. Furthermore, in this case, for example, the control unit may control a value of at least one internal parameter of the plurality of haptic signal generation units related to mixing of haptic signals, in addition to control of mixing ratios in the mixing unit. By the internal parameter being controlled in this manner, for example, for a haptic signal generation unit corresponding to a haptic signal having a lowered mixing ratio, the likelihood of the production policy of the generation algorithm can be lowered, and an intermediate state of a plurality of generation algorithms can be more naturally created.

Furthermore, in the present technology, for example, each of the plurality of haptic signal generation units related to mixing of haptic signals may output an envelope signal instead of a haptic signal including a sine wave of a predetermined frequency, and the mixing unit may multiply a signal obtained by mixing envelope signals output from the plurality of haptic signal generation units related to mixing of haptic signals by a sine wave of the predetermined frequency to obtain the output haptic signal including a sine wave of the predetermined frequency. In a case where sine wave conversion is performed in each of the plurality of haptic signal generation units related to mixing of haptic signals, and then mixing is performed, in a case where there is a phase shift in the sine waves in the respective haptic signal generation units, there is a possibility that an issue such as decrease in intensity of haptic sensation due to waveform deformation of the output haptic signal obtained by mixing may occur. Envelope signals are output from of the respective haptic signal generation units and mixed, and then multiplied by a sine wave to obtain the output haptic signal, whereby occurrence of such issue can be avoided.

Furthermore, in the present technology, for example, the mixing unit may convert haptic signals output from the plurality of haptic signal generation units related to mixing of haptic signals to the frequency domain, mix the signals, and convert the signals obtained by mixing to the time domain to obtain the output haptic signal. In this case, even if there is a phase shift in the sine wave signals used in the sine wave conversion units of the plurality of haptic signal generation units related to mixing of haptic signals, an issue such as decrease in intensity of haptic sensation due to waveform deformation of the output haptic signal obtained by mixing can be avoided.

Furthermore, in the present technology, for example, a post-processing unit that performs processing of normalization or clipping on the output haptic signal obtained by the mixing unit may be further included. Therefore, the amplitude level of the output haptic signal can be kept within an appropriate range.

BRIEF DESCRIPTION OF DRAWINGS

FIGS. 4A, 4B, and 4C are waveform diagrams used for describing operation of each unit of the vibration signal generation unit (production policy A).

FIG. 9 is a diagram illustrating an example of a user interface (UI) screen displayed on a display unit in a case where the mixing parameter t is adjusted by user operation.

FIGS. 10A, 10B, and 10C are diagrams illustrating an example of correspondence relation among the mixing parameter t corresponding to a moving position of an operator of a slider, f(t) that is the mixing ratio of the vibration signal Sha, and 1−f(t) that is a mixing ratio of a vibration signal Shb.

FIGS. 11A, 11B, 11C, and 11D are diagrams illustrating an example in a case where an internal parameter of only a vibration signal generation unit 114 that generates the vibration signal Shb is interlocked with the mixing ratio.

FIGS. 16A and 16B are diagrams illustrating an example of waveform display on the UI screen during adjustment of a vibration waveform.

FIG. 17 is a diagram illustrating an example of the UI screen during adjustment of a vibration waveform.

FIGS. 25A and 25B are diagrams used for describing time-series control of a mixing ratio.

FIGS. 26A, 26B, and 26C are diagrams illustrating an example in which a range of the mixing parameter t is set to a range of −1 to 2.

MODE FOR CARRYING OUT THE INVENTION

Hereinafter, a mode for carrying out the invention (hereinafter, referred to as an "embodiment") will be described. Note that the description will be given in the following order.

1. Embodiment
2. Modifications

1. Embodiment

[Configuration Example of Vibration Signal Generation Device]

Figure 1:
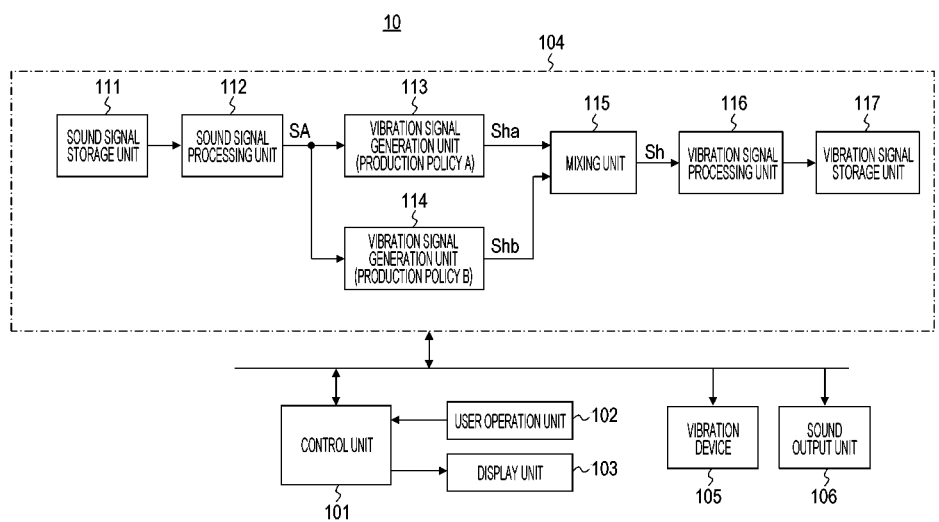
FIG. 1 is a bock diagram illustrating a configuration example of a haptic signal generation device as an embodiment.

FIG. 1 illustrates a configuration example of a haptic signal generation device 10 as an embodiment. The haptic signal generation device 10 includes a control unit 101, a user operation unit 102, a display unit 103, a processing unit 104, a vibration device 105, and a sound output unit 106. Note that, in the present embodiment, the haptic signal generation device 10 generates a vibration signal as a haptic signal, but the present technology is not limited to the embodiment in which a haptic signal is a vibration signal.

The control unit 101 includes a central processing unit (CPU) and controls operation of each unit of the haptic signal generation device 10. To the control unit 101, the user operation unit 102 and the display unit 103 forming a user interface are connected. The user operation unit 102 allows a user to perform various types of operation. For example, a user can perform operation of changing a mixing parameter, operation of adjusting a vibration waveform, and the like using the user operation unit 102 with reference to a user interface (UI) display displayed on the display unit 103.

The processing unit 104 generates a vibration signal (haptics signal) on the basis of a sound signal (sound signal). Details of the processing unit 104 will be described below. The vibration device 105 presents vibration to a user in contact with the vibration device 105. The vibration device 105 is used for appropriately checking a vibration state by the vibration signal generated by the processing unit 104. The sound output unit 106 is, for example, a speaker, a headphone, or the like, and is used for appropriately checking sound by a sound signal.

"Configuration Example of Processing Unit"

The processing unit 104 includes a sound signal storage unit 111, a sound signal processing unit 112, a vibration signal generation unit 113, a vibration signal generation unit 114, a mixing unit 115, a vibration signal processing unit 116, and a vibration signal storage unit 117.

The sound signal storage unit 111 stores a sound signal. The sound signal processing unit 112 performs, on the sound signal read from the sound signal storage unit 111, processing of volume normalization (normalization), for example, processing of maximizing the peak level within a range in which digital clipping does not occur.

The vibration signal generation unit 113 generates a vibration signal Sha on the basis of a sound signal SA processed by the sound signal processing unit 112. The vibration signal generation unit 113 generates the vibration signal Sha using a generation algorithm optimized for a production policy A (expressive power-oriented). The vibration signal generation unit 114 generates a vibration signal Shb on the basis of the sound signal SA processed by the sound signal processing unit 112. The vibration signal generation unit 114 generates the vibration signal Shb using a generation algorithm optimized for a production policy B (intensity-oriented).

"Configuration Example of Vibration Signal Generation Unit (Production Policy A)"

Figure 2:
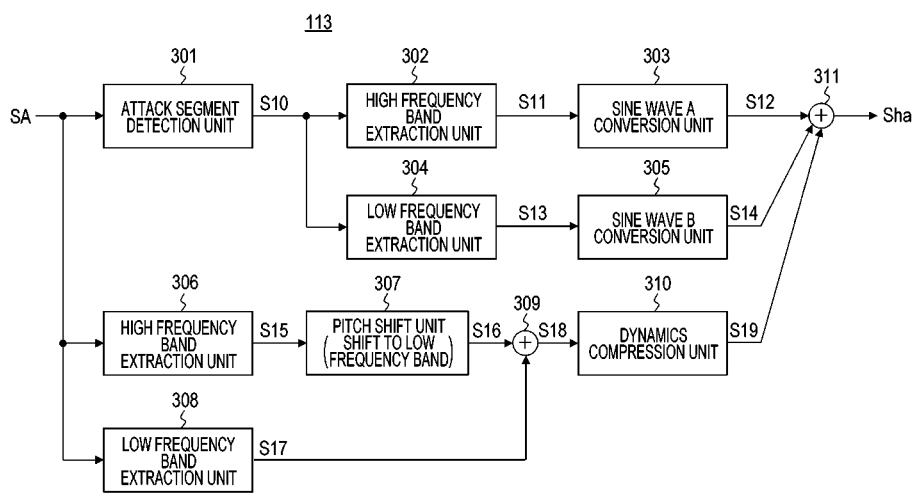
FIG. 2 is a block diagram illustrating a configuration of a vibration signal generation unit (production policy A).

FIG. 2 illustrates a configuration example of the vibration signal generation unit 113. As described above, the vibration signal generation unit 113 generates the vibration signal Sha using the generation algorithm optimized for the expressive power-oriented production policy A. The vibration signal generation unit 113 obtains the expressive power-oriented vibration signal Sha by picking up all the minute changes included in the sound signal SA and reflecting them in the vibration signal Sha.

The vibration signal generation unit 113 includes an attack segment detection unit 301, a high frequency band extraction unit 302, a sine wave A conversion unit 303, a low frequency band extraction unit 304, a sine wave B conversion unit 305, a high frequency band extraction unit 306, a pitch shift unit 307, a low frequency band extraction unit 308, an addition unit 309, a dynamics compression unit 310, and an addition unit 311.

Figure 3A:
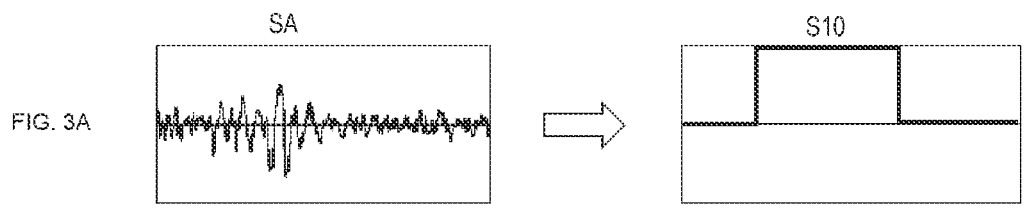
FIGS. 3A, 3B, and 3C are waveform diagrams used for describing operation of each unit of the vibration signal generation unit (production policy A).

The attack segment detection unit 301 detects a segment in which the sound pressure suddenly increases, that is, an attack segment, from a sound signal SA, and outputs an envelope signal S10 corresponding to the segment. The left part of FIG. 3A illustrates an example of a waveform of the sound signal SA, and the right part of FIG. 3A illustrates an example of a waveform of the envelope signal S10 output from the attack segment detection unit 301 corresponding to the sound signal SA. In the attack segment detection unit 301, the segment is extended or compressed by parameter adjustment, affecting the intensity of sine wave conversion.

The high frequency band extraction unit 302 extracts a segment including a large number of high frequency components from the output envelope signal S10 from the attack segment detection unit 301 that is corresponding to the attack segment, and outputs an envelope signal S11 corresponding to the segment. In the high frequency band extraction unit 302, a frequency range to be extracted is changed by parameter adjustment, affecting a segment converted into a sine wave A (for example, a vibration signal of 150 Hz or more), and thus light expression.

Figure 3B:
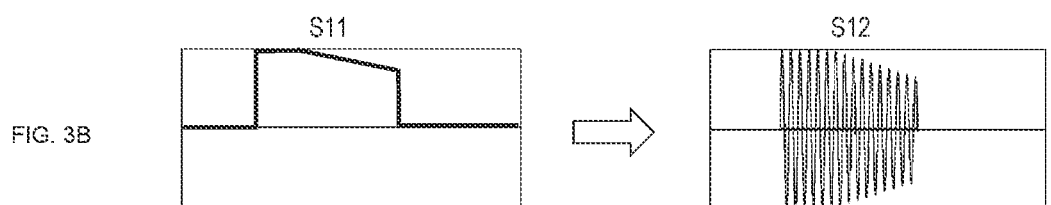

The sine wave A conversion unit 303 multiplies the output envelope signal S11 from the high frequency band extraction unit 302 by a sine wave A and outputs a vibration signal S12 of the sine wave A. The left part of FIG. 3B illustrates an example of a waveform of the output envelope signal S11 from the high frequency band extraction unit 302, and the right part of FIG. 3B illustrates an example of a waveform of the vibration signal S12 of the sine wave A output from the sine wave A conversion unit 303 corresponding to the output envelope signal S11. In the sine wave A conversion unit 303, the frequency of the sine wave A is changed by parameter adjustment, affecting light expression.

The low frequency band extraction unit 304 extracts a segment including a large number of low frequency components from the output envelope signal S10 from the attack segment detection unit 301 that is corresponding to the attack segment, and outputs an envelope signal S13 corresponding to the segment. In the low frequency band extraction unit 304, a frequency range to be extracted is changed by parameter adjustment, affecting a segment converted into a sine wave B (for example, a vibration signal of less than 150 Hz, in particular a resonance frequency f0 or the like of the vibration device), and thus heavy expression.

Figure 3C:
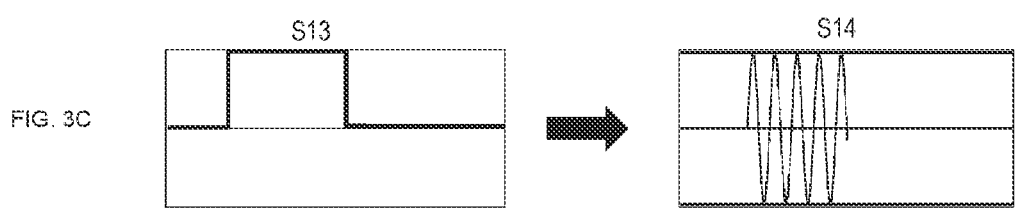

The sine wave B conversion unit 305 multiplies the output envelope signal S13 from the low frequency band extraction unit 304 by a sine wave B and outputs a vibration signal S14 of the sine wave B. The left part of FIG. 3C illustrates an example of a waveform of the output envelope signal S13 from the low frequency band extraction unit 304, and the right part of FIG. 3C illustrates an example of a waveform of the vibration signal S14 of the sine wave B output from the sine wave B conversion unit 305 corresponding to the output envelope signal S13. In the sine wave B conversion unit 305, the frequency of the sine wave B is changed by parameter adjustment, affecting heavy expression.

The high frequency band extraction unit 306 extracts a high frequency component S15 from the sound signal SA and outputs the high frequency component S15. The left part of FIG. 4A illustrates an example of a waveform of the sound signal SA, and the upper right part of FIG. 4A illustrates an example of a waveform of the high frequency component S15 output from the high frequency band extraction unit 306 corresponding to the sound signal SA. In the high frequency band extraction unit 306, a frequency range to be extracted is changed by parameter adjustment.

The pitch shift unit 307 shifts the output frequency component S15 from the high frequency band extraction unit 306 to a low frequency band (so that it falls within 1000 Hz or less) and outputs a frequency component S16 that has been shifted to a low frequency band. By the output frequency component S15 being shifted to a low frequency band in this manner, a signal can be perceived as vibration. The left part of FIG. 4B illustrates an example of a waveform of the output frequency component S15 from the high frequency band extraction unit 306, and the right part of FIG. 4B illustrates an example of a waveform of the frequency component S16 output from the pitch shift unit 307 corresponding to the output frequency component S15. In the pitch shift unit 307, the degree of the shift is changed by parameter adjustment, affecting bodily sensation.

The low frequency band extraction unit 308 extracts a low frequency component S17 from the sound signal SA and outputs the low frequency component S17. The left part of FIG. 4A illustrates the example of the waveform of the sound signal SA, and the lower right part of FIG. 4A illustrates an example of a waveform of the low frequency component S17 output from the low frequency band extraction unit 308 corresponding to the sound signal SA. In the low frequency band extraction unit 308, a frequency range to be extracted is changed by parameter adjustment.

The addition unit 309 adds (mixes) the output frequency component S16 from the pitch shift unit 307 and the output frequency component S16 from the low frequency band extraction unit 308. The dynamics compression unit 310 adjusts an output frequency component 318 from the addition unit 309 so as to reduce difference in intonation, and outputs the frequency component 318 as a vibration signal S19. By the difference in intonation being adjusted to be reduced in this manner, a vibration signal that makes minute vibration easier to be perceived can be generated. The left part of FIG. 4C illustrates an example of a waveform of the output frequency component S18 from the addition unit 309, and the right part of FIG. 4C illustrates an example of a waveform of the vibration signal S19 output from the dynamics compression unit 310 corresponding to the output frequency component S18. In the dynamics compression unit 310, the degree of the compression is changed by parameter adjustment, affecting the ease of perceiving minute vibration.

The addition unit 311 adds (mixes) the output vibration signal S12 from the sine wave A conversion unit 303, the output vibration signal S14 from the sine wave B conversion unit 305, and the output vibration signal S19 from the dynamics compression unit 310, and outputs a signal obtained by the addition as the vibration signal Sha. Note that, at this time, for a segment in which attack is detected, processing of outputting only attack signals, that is, the vibration signal S12 and the vibration signal S14 may be performed. In this case, the intensity can be maintained by the attack signals being output as they are.

The vibration signal generation unit 113 illustrated in FIG. 2 changes a sine wave for conversion for each target frequency for attack detection, and can generate a vibration signal that well expresses the characteristic of a sound. Furthermore, the vibration signal generation unit 113 illustrated in FIG. 2 performs vibration conversion even on minute sound pressure changes, and can generate a vibration signal capable of expressing fine vibration while losing sharpness.

"Configuration Example of Vibration Signal Generation Unit (Production Policy B)"

Figure 5:
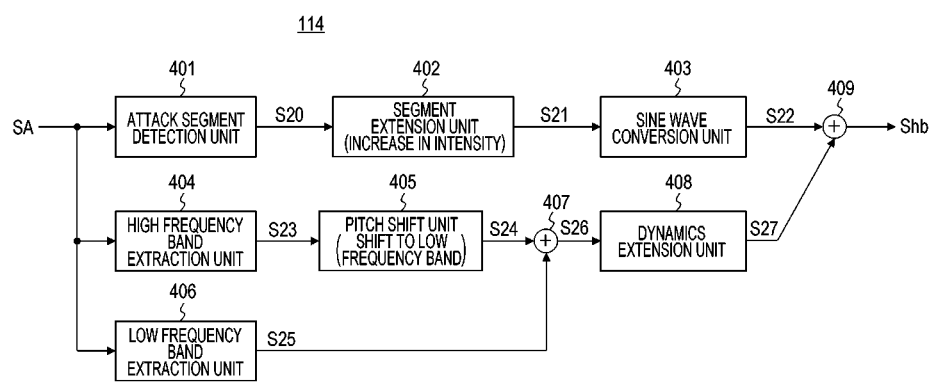
FIG. 5 is a block diagram illustrating a configuration of a vibration signal generation unit (production policy B).

FIG. 5 illustrates a configuration example of the vibration signal generation unit 114. As described above, the vibration signal generation unit 114 generates the vibration signal Shb using the generation algorithm optimized for the intensity-oriented production policy B. The vibration signal generation unit 114 obtains the intensity-oriented vibration signal Shb by rather giving up minute changes included in the sound signal SA.

The vibration signal generation unit 114 includes an attack segment detection unit 401, a segment extension unit 402, a sine wave conversion unit 403, a high frequency band extraction unit 404, a pitch shift unit 405, a low frequency band extraction unit 406, an addition unit 407, a dynamics extension unit 408, and an addition unit 409.

Figure 6A:
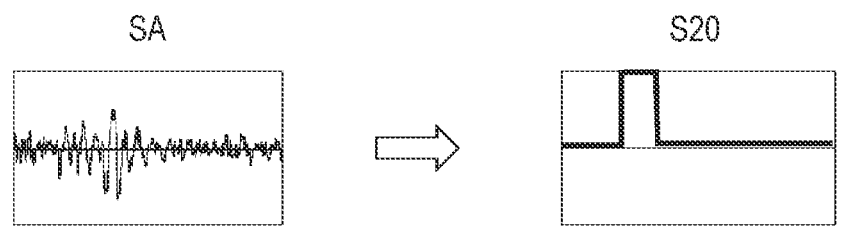
FIGS. 6A, 6B, and 6C are waveform diagrams used for describing operation of each unit of the vibration signal generation unit (production policy B).

The attack segment detection unit 401 detects a segment in which the sound pressure suddenly increases, that is, an attack segment, from the sound signal SA, and outputs an envelope signal S20 corresponding to the segment. The left part of FIG. 6A illustrates an example of a waveform of the sound signal SA, and the right part of FIG. 6A illustrates an example of a waveform of the envelope signal S20 output from the attack segment detection unit 401 corresponding to the sound signal SA. In the attack segment detection unit 401, the segment is extended or compressed by parameter adjustment, affecting the intensity of sine wave conversion.

Figure 6B:
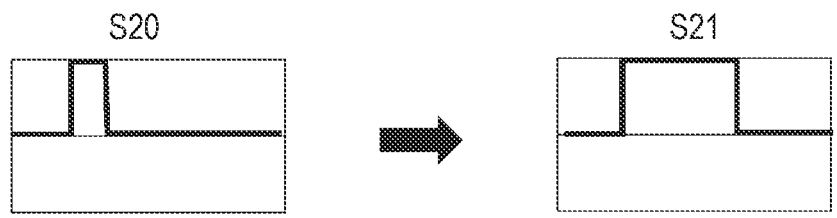

The segment extension unit 402 extends the output envelope signal S20 from the attack segment detection unit 301 in the time direction to extend the detected attack segment, and outputs an envelope signal S21 obtained by the extending. When a sine wave is obtained by conversion, the output time of the sine wave gets long by the attack segment being extended in the time direction, and it is strongly perceived as bodily sensation. The left part of FIG. 6B illustrates an example of a waveform of the output envelope signal S20 from the attack segment detection unit 401, and the right part of FIG. 6B illustrates an example of a waveform of the envelope signal S21 output from the segment extension unit 402 corresponding to the output envelope signal S20. In the segment extension unit 402, the degree of the extension is changed by parameter adjustment, affecting bodiy sensation.

Figure 6C:
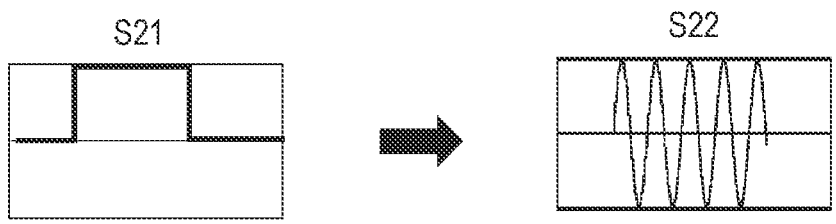

The sine wave conversion unit 403 multiplies the output envelope signal S21 from the segment extension unit 402 by a sine wave (for example, a vibrating signal of less than 150 Hz, in particular a resonance frequency f0 or the like of the vibration device) and outputs a vibration signal S22. The left part of FIG. 6C illustrates an example of a waveform of the output envelope signal S21 from the segment extension unit 402, and the right part of FIG. 6C illustrates an example of a waveform of the vibration signal S22 output from the sine wave conversion unit 403 corresponding to the output envelope signal S21. In the sine wave conversion unit 403, the frequency of a sine wave is changed by parameter adjustment, affecting heavy expression.

Figure 7A:
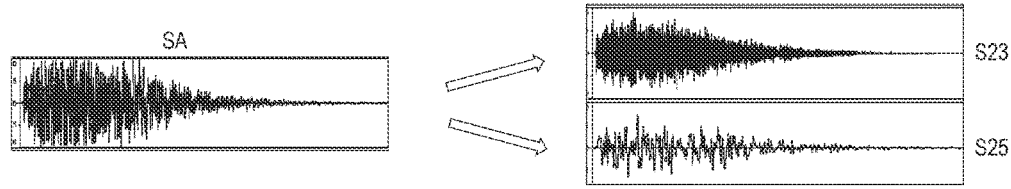
FIGS. 7A, 7B, and 7C are waveform diagrams used for describing operation of each unit of the vibration signal generation unit (production policy B).

The high frequency band extraction unit 404 extracts a high frequency component S23 from the sound signal SA and outputs the high frequency component S23. The left part of FIG. 7A illustrates an example of a waveform of the sound signal SA, and the upper right part of FIG. 7A illustrates an example of a waveform of the high frequency component S23 output from the high frequency band extraction unit 404 corresponding to the sound signal SA. In the high frequency band extraction unit 404, a frequency range to be extracted is changed by parameter adjustment.

Figure 7B:
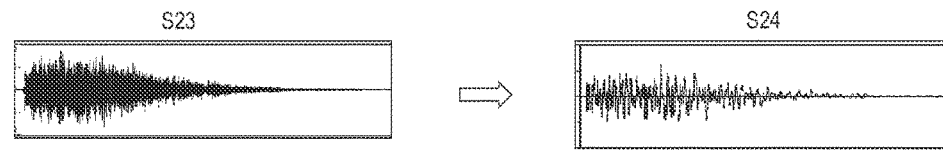

The pitch shift unit 405 shifts the output frequency component S23 from the high frequency band extraction unit 306 to a low frequency band (so that it falls within 1000 Hz or less) and outputs a frequency component S24 that has been shifted to a low frequency band. By the output frequency component S23 being shifted to a low frequency band in this manner, a signal can be perceived as vibration. The left part of FIG. 7B illustrates an example of a waveform of the output frequency component S23 from the high frequency band extraction unit 404, and the right part of FIG. 7B illustrates an example of a waveform of the high frequency component S24 output from the pitch shift unit 405 corresponding to the output frequency component S23. In the pitch shift unit 405, the degree of the shift is changed by parameter adjustment, affecting bodily sensation.

The low frequency band extraction unit 406 extracts a low frequency component S25 from the sound signal SA and outputs the low frequency component S25. The left part of FIG. 7A illustrates an example of a waveform of the sound signal SA, and the lower right part of FIG. 7A illustrates an example of a waveform of the low frequency component S25 output from the low frequency band extraction unit 406 corresponding to the sound signal SA. In the low frequency band extraction unit 406, a frequency range to be extracted is changed by parameter adjustment.

Figure 7C:
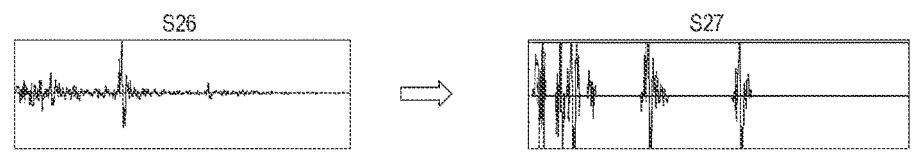

The addition unit 407 adds (mixes) the output frequency component S24 from the pitch shift unit 405 and the output frequency component S25 from the low frequency band extraction unit 406. The dynamics extension unit 408 adjusts an output frequency component S26 from the addition unit 407 so as to increase difference in intonation, and outputs the frequency component S26 as a vibration signal S27. By adjusting difference in intonation to be increased in this manner, a vibration signal that makes sharp vibration perceived can be generated. The left part of FIG. 7C illustrates an example of a waveform of the output frequency component S26 from the addition unit 407, and the right part of FIG. 7C illustrates an example of a waveform of the vibration signal S27 output from the dynamics extension unit 408 corresponding to the output frequency component S26. In the dynamics extension unit 408, the degree of the extension is changed by parameter adjustment, affecting the sharpness of vibration.

The addition unit 409 adds (mixes) the output vibration signal S12 from the sine wave conversion unit 403, the output vibration signal S27 from the dynamics extension unit 408, and outputs a signal obtained by the addition as the vibration signal Shb. Note that, at this time, for a segment in which attack is detected, processing of outputting only an attack signal, that is, the vibration signal S22 may be performed. In this case, the intensity can be maintained by the attack signals being output as they are.

Returning to FIG. 1, the mixing unit 115 mixes the vibration signal Sha generated by the vibration signal generation unit 113 and the vibration signal Shb generated by the vibration signal generation unit 114 to obtain a vibration signal Sh having vibration expression in the intermediate state of the two generation algorithms. For example, the control unit 101 controls mixing ratios to preset values. As for the mixing ratios, in a case where a mixing ratio of the vibration signal Sha is m, a mixing ratio of the vibration signal Shb is (1−m). The preset values of the mixing ratios are held in, for example, a memory in the control unit 101.

Figure 8A:
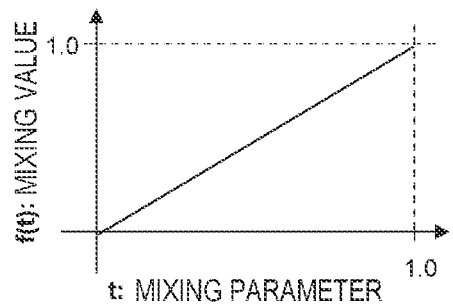
FIGS. 8A, 8B, and 8C are diagrams illustrating an example of correspondence relation between a mixing parameter t and a mixing value f(t) that is a mixing ratio of a vibration signal Sha.
Figure 8B:
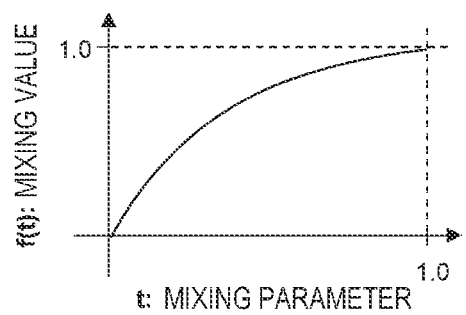
Figure 8C:
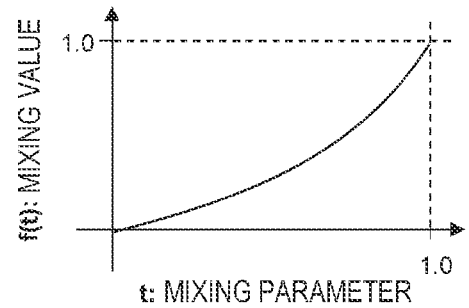

Furthermore, the control unit 101 controls, for example, the mixing ratios to values corresponding to a mixing parameter (mix parameter) by user operation. FIGS. 8A, 8B, and 8C illustrate an example of correspondence relation between a mixing parameter t and a mixing value (mix value) f(t) that is the mixing ratio of the vibration signal Sha. In this case, the mixing ratio of the vibration signal Shb is 1−f(t).

As the correspondence relation, non-linearity is also conceivable in addition to linearity. In the correspondence relation in FIG. 8A, the mixing ratio f(t) changes linearly corresponding to the change of the mixing parameter t. Furthermore, in the correspondence relation in FIGS. 8B and 8C, the mixing ratio f(t) changes non-linearly corresponding to the change of the mixing parameter t. Considering a human sense, even in a case where the two vibration signals are mixed on a one-to-one basis, it is well assumed that the two vibration signals do not feel like they are mixed on a one-to-one basis. In this case, user operation feeling can be matched to the sense of mixing using non-linearity.

FIG. 9 illustrates an example of a user interface (UI) screen displayed on the display unit 103 in a case where the mixing parameter t is adjusted by user operation. The UI screen includes an operation unit 511 including a displayed slider by which a user adjusts the mixing parameter t, a first waveform display unit 512 on which a waveform of a sound signal is displayed, and a second waveform display unit 513 on which a waveform of a vibration signal obtained by mixing is displayed.

A user can adjust the mixing parameter t between 0 and 1 by moving an operator of the slider displayed on the operation unit 511. In the illustrated example, a state in which the mixing parameter t is at 0.25 is illustrated. The waveform of the vibration signal obtained by mixing displayed on the second waveform display unit 513 changes corresponding to the change of the mixing parameter t. By the vibration device 105 being actually vibrated by the vibration signal obtained by mixing and the state of the vibration being referred to, a user can efficiently adjust the mixing parameter t to an appropriate mixing parameter t, and thus appropriate mixing ratios.

FIGS. 10A, 10B, and 10C illustrate an example of correspondence relation among the mixing parameter t corresponding to a moving position of the operator of the slider, f(t) that is the mixing ratio of the vibration signal Sha, and 1−f(t) that is the mixing ratio of the vibration signal Shb. FIG. 10A illustrates the moving position of the operator of the slider, FIG. 10B illustrates f(t), and FIG. 10C illustrates 1−f(t). The example is an example in a case where the mixing ratios f(t) and 1−f(t) change linearly corresponding to the change of the mixing parameter t.

Note that it is conceivable that vibration expression in the intermediate state in a case of mixing is made more natural by an internal parameter managing the likelihood of the production policy A in the vibration signal generation unit 113 and an internal parameter managing the likelihood of the production policy B in the vibration signal generation unit 114 being interlocked with the mixing ratios. The internal parameter(s) of only the vibration signal generation unit 113, only the vibration signal generation unit 114, or both the vibration signal generation unit 113 and the vibration signal generation unit 114 is/are interlocked with the mixing ratio (s).

Figure 12:
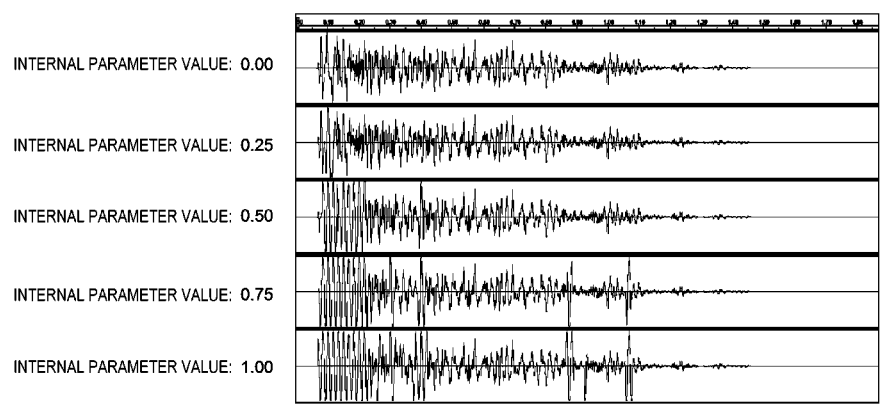
FIG. 12 is a diagram illustrating change examples of a waveform of the vibration signal Shb at respective values of the internal parameter value.

FIGS. 11A, 11B, 11C, and 11D illustrate an example in a case where the internal parameter of only the vibration signal generation unit 114 that generates the vibration signal Shb is interlocked with the mixing ratio. FIGS. 11A, 11B, and 11C are the same as FIGS. 10A, 10B, and 10C, respectively. FIG. 11D illustrates a change in the internal parameter managing the likelihood of the production policy B in the vibration signal generation unit 114. In this case, the internal parameter increases as the mixing ratio 1−f(t) of the vibration signal Shb increases, and the likelihood of the production policy B in the vibration signal generation unit 114 increases. FIG. 12 illustrates change examples of a waveform of the vibration signal Shb at respective values of the internal parameter value.

By the internal parameter being controlled being interlocked with the mixing ratio in this manner, for example, for a vibration signal generation unit corresponding to a vibration signal having a lowered mixing ratio, the likelihood of the production policy of the generation algorithm can be lowered, and an intermediate state of a plurality of generation algorithms can be more naturally created.

Returning to FIG. 1, the vibration signal processing unit 116 performs processing of normalization or clipping on the vibration signal Sh obtained by the mixing unit 115 so as to keep the amplitude level of the vibration signal Sh within an appropriate range. The vibration signal storage unit 117 stores the vibration signal Sh on which the processing has been performed by the vibration signal processing unit 116.

Figure 13:
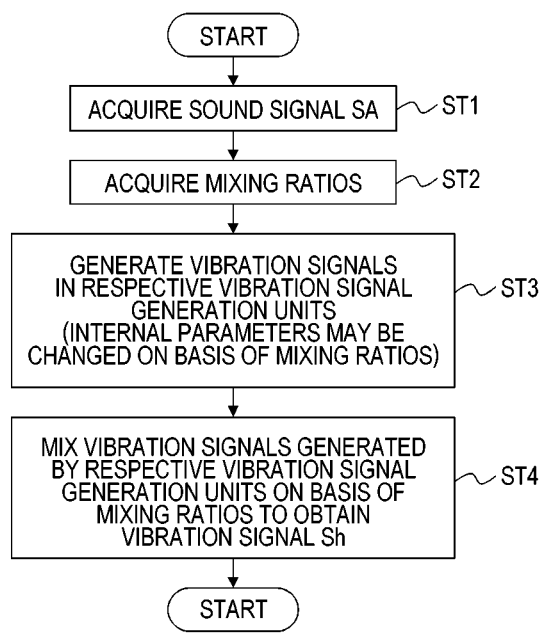
FIG. 13 is a flowchart schematically illustrating a procedure of processing until a vibration signal Sh is obtained from a sound signal A.

The flowchart of FIG. 13 schematically illustrates a procedure of processing until the vibration signal Sh is obtained from the sound signal A in the haptic signal generation device 10 illustrated in FIG. 1. In step ST1, the haptic signal generation device 10 acquires the sound signal SA. Next, the haptic signal generation device 10 acquires the mixing ratios in step ST2.

Next, in step ST3, the haptic signal generation device 10 generates the vibration signal Sha from the sound signal SA in the vibration signal generation unit 113 and the vibration signal Shb from the sound signal SA in the vibration signal generation unit 114. In this case, the internal parameters may be changed on the basis of the mixing ratios. Next, in step ST4, the haptic signal generation device 10 mixes the vibration signals Sha and Shb generated by the respective vibration signal generation units on the basis of the mixing ratios to obtain the vibration signal Sh.

As described above, in the haptic signal generation device 10 illustrated in FIG. 1, the vibration signals Sha and Shb generated using the two different generation algorithms are mixed to obtain the output vibration signal Sh. Therefore, the vibration signal can be satisfactorily generated using the intermediate state of the two generation algorithms.

"Editing Processing on Mixed Vibration Signal"

In the haptic signal generation device 10 illustrated in FIG. 1, a vibration waveform of the vibration signal Sh obtained by mixing the vibration signals Sha and Shb as described above can be adjusted.

Figure 14:
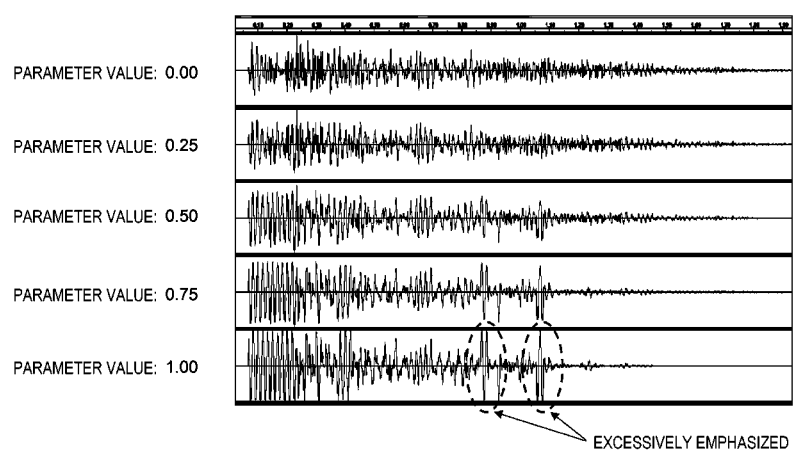
FIG. 14 is a diagram illustrating an example of waveforms of the vibration signal Sh at respective parameter values of the mixing parameter t.

FIG. 14 illustrates an example of waveforms of the vibration signal Sh at respective parameter values of the mixing parameter t. As a parameter value increases, vibration feels more intensified. In this case, segments that are not desired to be emphasized such as segments surrounded by broken-line circles may be excessively emphasized, and the vibration may be intensified.

Figure 15A:
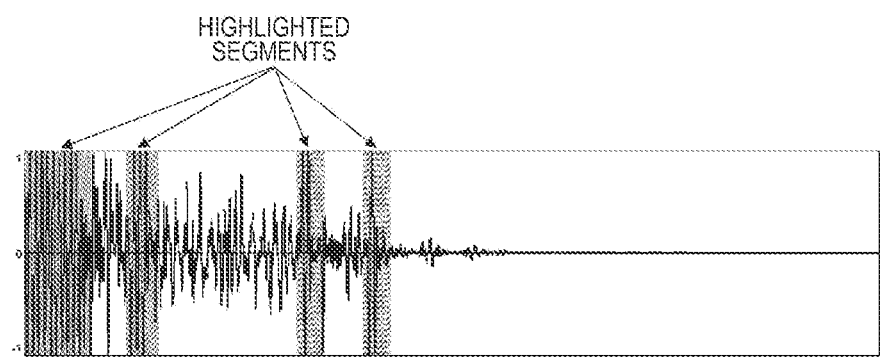
FIGS. 15A and 15B are diagrams illustrating an example of waveform display on a UI screen during adjustment of a vibration waveform.

During adjustment of the vibration waveform, for example, segments that may be excessively emphasized (excessively reflecting the production policy) are automatically highlighted on the waveform of the vibration signal Sh displayed on a UI screen displayed on the display unit 103 as illustrated in FIG. 15A, and a user can adjust the vibration waveform in the segments by selecting a segment including the vibration waveform desired to be adjusted and performing operation. As the adjustment operation of the vibration waveform, weakening the amplitude, shifting the frequency, generating the vibration signal again after changing the internal parameter to weaken the effect of the production policy, and the like are conceivable.

Figure 15B:
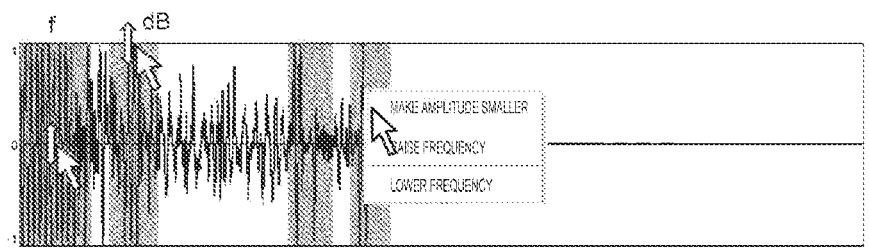

In this case, for example, a mouse cursor is put on the segments, then an adjustment UI for changing the amplitude "dB" and the frequency "f" appears as illustrated in FIG. 15B. Furthermore, for example, right clicking of a mouse causes a menu item for adjustment to appear. Furthermore, for example, operation of selecting and deleting a highlighted segment is also possible, and in that case, low-pass filtering processing is performed so that the preceding and subsequent waveforms are smoothly continued.

Furthermore, during the adjustment of the vibration waveform, for example, as illustrated in FIG. 16A, segments including a periodic vibration waveform in which the intervals between vibration and vibration are narrowed are automatically highlighted on the waveform of the vibration signal Sh displayed on the UI screen displayed on the display unit 103, and for example, a mouse cursor is put on the segments by a user, then an adjustment UI for changing the lengths of vibration appears, and as illustrated in FIG. 16B, the user can also perform operation of shortening the lengths of a plurality of the continuous vibration segments at once.

FIG. 17 illustrates an example of the UI screen displayed on the display unit 103 during the adjustment of the vibration waveform. The UI screen includes an operation unit 611 on which a user performs adjustment operation of the vibration waveform, a first waveform display unit 612 on which a waveform of the sound signal is displayed, and a second waveform display unit 613 on which a waveform of the vibration signal obtained by mixing is displayed.

Figure 18:
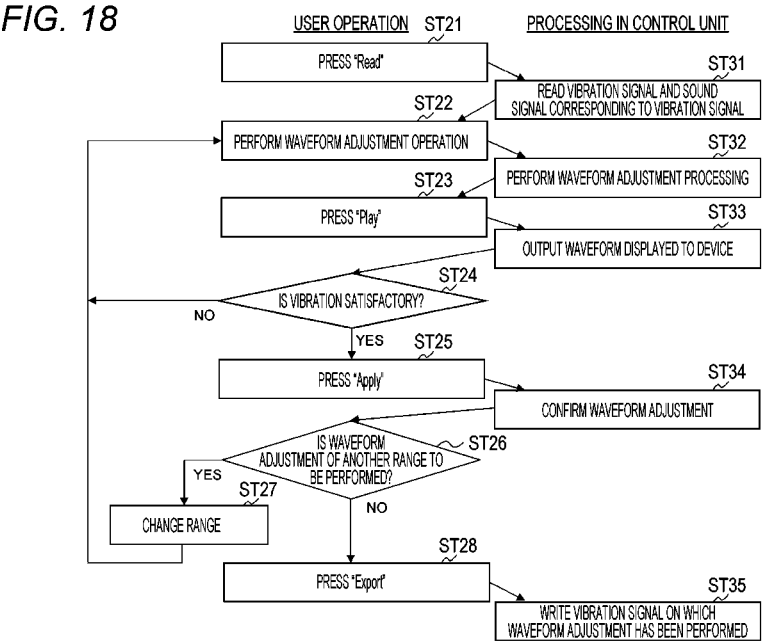
FIG. 18 is a sequence diagram illustrating an example of a processing procedure in a case where a user performs adjustment operation of a vibration waveform.

The sequence diagram of FIG. 18 illustrates an example of a processing procedure in a case where a user performs the adjustment operation of a vibration waveform. A user presses "Read" in step ST21, then the control unit 101 reads the vibration signal Sh as an adjustment target and the sound signal SA corresponding to the vibration signal Sh from the vibration signal storage unit 117 and the sound signal storage unit 111, respectively, and holds them in an internal memory in step ST31. Therefore, a waveform of the vibration signal Sh related to the adjustment is displayed on the second waveform display unit 613, and a waveform of the sound signal SA corresponding to the vibration signal Sh is displayed on the first waveform display unit 612.

The user can perform waveform adjustment of the vibration signal Sh within a range of the waveform that is displayed on the second waveform display unit 613. In a case where the waveform adjustment of another range of the vibration signal Sh is performed, the user performs scroll operation to change the range of the waveform of the vibration signal Sh that is displayed on the second waveform display unit 613. Corresponding to this change, the waveform of the sound signal SA displayed on the first waveform display unit 612 is also automatically changed.

In the waveform of the vibration signal Sh displayed on the second waveform display unit 613, for example, as illustrated in FIG. 15(a), segments that may be excessively emphasized are automatically highlighted, and for example, as illustrated in FIG. 16(a), segments including a periodic vibration waveform in which the intervals between vibration and vibration are narrowed are automatically highlighted. The user can perform the waveform adjustment operation on the segments highlighted in this manner.

In the waveform of the vibration signal Sh displayed on the second waveform display unit 613, for example, as illustrated in FIG. 15A, segments that may be excessively emphasized are automatically highlighted, and for example, as illustrated in FIG. 16A, segments including a periodic vibration waveform in which the intervals between vibration and vibration are narrowed are automatically highlighted. The user can perform the waveform adjustment operation on the segments highlighted in this manner.

Next, the user performs the waveform adjustment operation in step ST22. For example, by putting a mouse cursor on a segment on which the waveform adjustment is desired to be performed, operation of changing the amplitude "dB" or the frequency "f" or deleting a waveform in the segment can be performed as illustrated in FIG. 15B. Furthermore, for example, the user can perform operation of shortening the lengths of a plurality of continuous vibration segments at once as illustrated in FIG. 16B.

Note that the waveform adjustment operation is not limited thereto. For example, the operation may include operation of changing the mixing ratios in the mixing unit 115 and operation of changing the internal parameters of the vibration signal generation unit 113 and the vibration signal generation unit 114. In this case, in a segment on which the waveform adjustment is performed, the vibration signal Sh is generated again on the basis of the changed mixing ratios and internal parameters, whereby the waveform adjustment is performed.

The user performs the waveform adjustment operation, then in step ST32, according to the user operation, the control unit 101 performs the waveform adjustment processing on the vibration signal Sh in the segment on which the waveform adjustment is performed. In this case, the waveform after the adjustment of the vibration signal Sh is displayed on the second waveform display unit 613.

Next, the user presses "Play" in step ST23, then in step ST33, the control unit 101 outputs the vibration signal Sh on which the waveform adjustment has been performed and is corresponding to the waveform displayed on the second waveform display unit 613 to the vibration device 105. Therefore, the user can check vibration caused by the vibration signal Sh on which the waveform adjustment has been performed. Note that, in this case, the corresponding sound signal SA may be output to the sound output unit 106 in synchronization with the output of the vibration signal Sh. Therefore, the user can check the vibration together with sound.

Next, the user determines whether or not the vibration is satisfactory in step ST24. In a case where the vibration is not satisfactory, the user returns to the processing of step ST22. On the other hand, in a case where the vibration is satisfactory in step ST24, the user presses "Apply" in step ST25. The user presses "Apply", then in step ST34, the control unit 101 confirms the waveform adjustment in the range of the waveform that is displayed on the second waveform display unit 613.

Next, in step ST26, the user determines whether or not to perform the waveform adjustment of another range of the vibration signal Sh that is different from the range of the waveform that is displayed on the second waveform display unit 613. Note that, in a case where the user has not performed the waveform adjustment operation in step ST22, the processing may immediately proceed to step ST26. In a case where the waveform adjustment of another range of the vibration signal Sh is performed, the user performs scroll operation to change the range of the vibration signal Sh on the second waveform display unit 613 in step ST27. Thereafter, the user returns to the processing of step ST22.

In a case where the waveform adjustment of another range is not performed in step ST26, the user presses "Export" in step ST28. The user presses "Export", then the control unit 101 writes the vibration signal Sh on which the waveform adjustment has been performed in the internal memory into the vibration signal storage unit 117 in step ST35. In this case, the file may be overwritten or may be stored as a new file.

"Configuration Change of Vibration Signal Generation Device"

Figure 19:
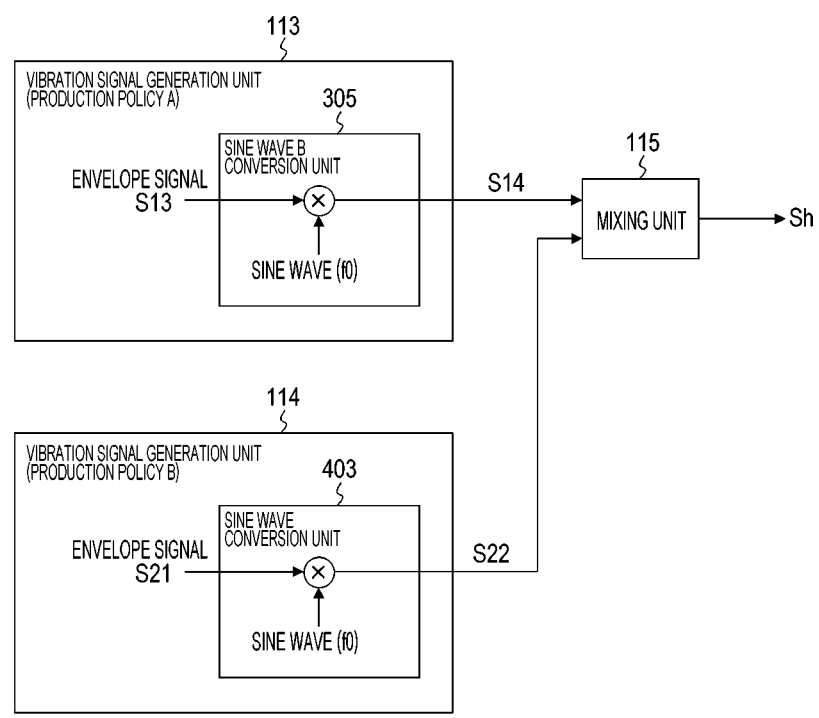
FIG. 19 is a block diagram of a part of a vibration signal generation device that is taken out.

In the haptic signal generation device 10 illustrated in FIG. 1, as illustrated in FIG. 19, the sine wave B conversion unit 305 of the vibration signal generation unit 113 multiplies the envelope signal S13 by, for example, a sine wave of a resonance frequency f0 of the vibration device to obtain the vibration signal S14 of the sine wave (f0), and the sine wave conversion unit 403 of the vibration signal generation unit 114 multiplies the envelope signal S21 by, for example, a sine wave of a resonance frequency f0 of the vibration device to obtain the vibration signal S22 of the sine wave (f0), and these are mixed (added) by the mixing unit 115.

In this case, in a case where there is a phase shift between the sine wave (f0) used in the sine wave B conversion unit 305 and the sine wave (f0) used in the sine wave conversion unit 403, there is a possibility that an issue such as decrease in vibration intensity due to waveform deformation of the vibration signal Sh obtained by mixing in the mixing unit 115 may occur.

Figure 20:
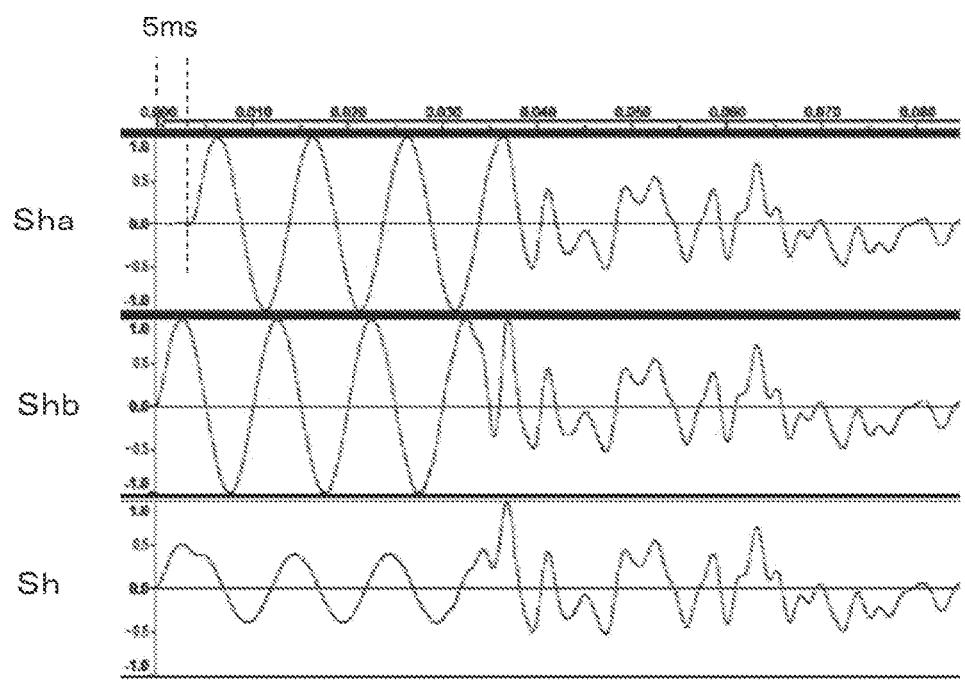
FIGS. 20A, 20B, and 20C are diagrams used for describing waveform deformation of a vibration signal obtained by mixing generated in a case where there is a phase shift in sine waves used in two vibration signal generation units.

FIGS. 20A, 20B, and 20C illustrate an example of a case where such issue occurs. FIG. 20A illustrates a waveform of the vibration signal Sha generated by the vibration signal generation unit 113, FIG. 20B illustrates a waveform of the vibration signal Shb generated by the vibration signal generation unit 114, and FIG. 20C illustrates a waveform of the vibration signal Sh obtained by mixing 50% of each. This example indicates a case where there is a phase shift of 5 ms in sine waves (f0) obtained by multiplying due to attack detection in the vibration signal generation unit 113 and the vibration signal generation unit 114, and occurrence of waveform deformation of the vibration signal Sh. In this case, an issue such as decrease in vibration intensity occurs.

"Configuration Change Example (1)"

Figure 21:
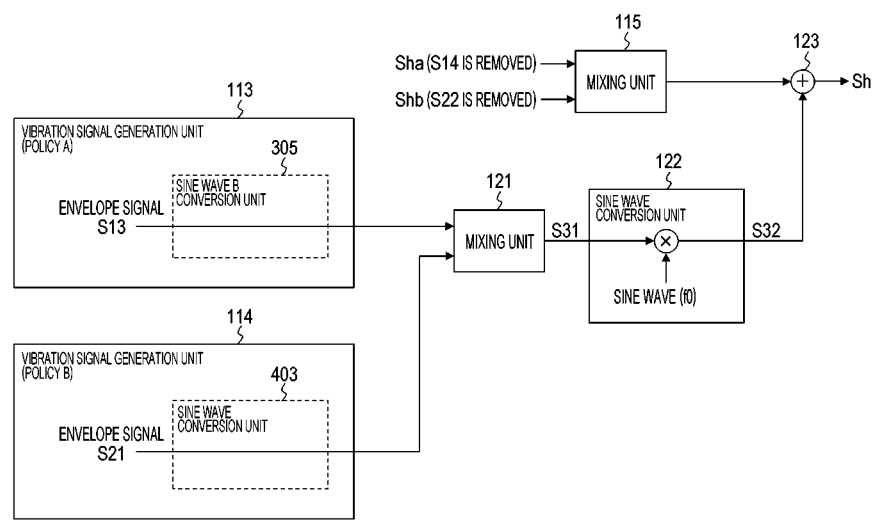
FIG. 21 is a block diagram illustrating a configuration change example (1) of the vibration signal generation device.

FIG. 21 illustrates a configuration change example (1). In FIG. 21, portions corresponding to those in FIG. 1, FIG. 2, and FIG. 5 are denoted by the same reference signs.

The vibration signal generation unit 113 outputs the envelope signal S13 as it is instead of outputting the vibration signal S14. In this case, the sine wave B conversion unit 305 is unnecessary for the vibration signal generation unit 113. Furthermore, the vibration signal generation unit 114 outputs the envelope signal S21 as it is instead of outputting the vibration signal S22. In this case, the sine wave conversion unit 403 is unnecessary for the vibration signal generation unit 114.

The envelope signal S13 output from the vibration signal generation unit 113 and the envelope signal S21 output from the vibration signal generation unit 114 are mixed by a mixing unit 121. The mixing ratios in the mixing unit 121 correspond to the mixing ratios in the mixing unit 115. A sine wave conversion unit 122 multiplies an envelope signal S31 output from the mixing unit 121 by a sine wave (f0) and outputs a vibration signal S32.

Then, an addition unit 123 adds the vibration signal S32 output from the sine wave conversion unit 122 to the vibration signal output from the mixing unit 115 to obtain the vibration signal Sh. Note that, in this case, the vibration signal Sha from the vibration signal generation unit 113 that is input to the mixing unit 115 is obtained by removing the vibration signal S14 related to the sine wave B conversion unit 305, and similarly, the vibration signal Shb from the vibration signal generation unit 114 that is input to the mixing unit 115 is obtained by removing the vibration signal S14 related to the sine wave conversion unit 403.

Figure 22:
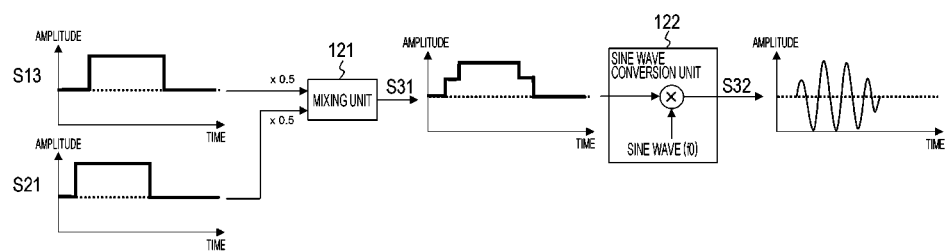
FIG. 22 is a diagram illustrating an example of waveforms of respective units in the configuration change example (1).

FIG. 22 illustrates an example of waveforms of the envelope signals S13 and S21 input to the mixing unit 121, a waveform of the envelope signal S31 after mixing output from the mixing unit 121, and a waveform of the vibration signal S32 of a sine wave (f0) output from the sine wave conversion unit 122.

Using the configuration illustrated in FIG. 21, occurrence of the issue that occurs in the configuration illustrated in FIG. 19 such as decrease in vibration intensity due to waveform deformation of the vibration signal Sh obtained by mixing in the mixing unit 115 in a case where there is a phase shift between the sine wave (f0) used in the sine wave B conversion unit 305 and the sine wave (f0) used in the sine wave conversion unit 403 can be avoided.

"Configuration Change Example (2)"

Figure 23:
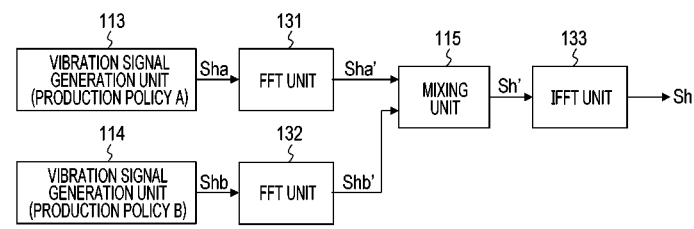
FIG. 23 is a block diagram illustrating a configuration change example (2) of the vibration signal generation device.

FIG. 23 illustrates a configuration change example (2). In FIG. 23, portions corresponding to those in FIG. 1 are denoted by the same reference signs.

The vibration signal Sha generated by the vibration signal generation unit 113 is converted into a signal in the frequency domain Sha' by a fast Fourier transform (FFT) unit 131. Furthermore, the vibration signal Shb generated by the vibration signal generation unit 114 is converted into a signal in the frequency domain Shb' by an FFT unit 132. In the mixing unit 115, the signals in the frequency domain Sha' and Shb' are mixed.

Then, an inverse fast Fourier transform (IFFT) unit 133 converts a signal in the frequency domain Sh' obtained by mixing by the mixing unit 115 into a signal in the time domain to obtain the vibration signal Sh. Note that phase information is required in a case where the IFFT unit 133 converts a signal in the frequency domain into a signal in the time domain. As the phase information, for example, phase information of the vibration signal Sha or the vibration signal Shb is used, or phase information obtained by phase restoration is used.

Figure 24:
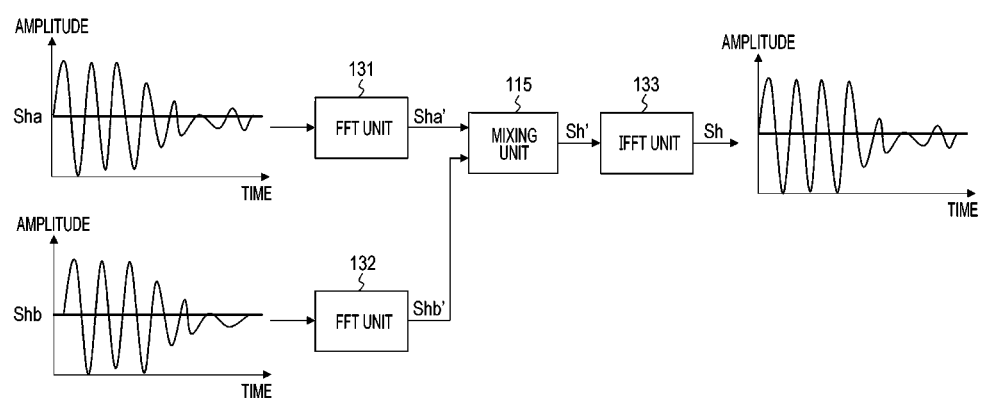
FIG. 24 is a diagram illustrating an example of waveforms of respective units in the configuration change example (2).

FIG. 24 illustrates an example of a waveform of the vibration signal Sha output from the vibration signal generation unit 113 and input to the FFT unit 131, a waveform of the vibration signal Shb output from the vibration signal generation unit 114 and input to the FFT unit 132, and a waveform of the vibration signal Sh output from the IFFT unit 133. Although there is a phase shift in the sine waves in the attack detection segments between the vibration signal Sha and the vibration signal Shb, waveform deformation due to the phase shift does not occur in the vibration signal Sh output from the IFFT unit 133.

Using the configuration illustrated in FIG. 23, waveform deformation of the vibration signal Sh obtained by mixing can be prevented, for example, even if there is a phase shift in the sine waves in the attack detection segments between the vibration signal Sha and the vibration signal Shb, and an issue such as decrease in vibration intensity can be avoided.

<2. Modifications>

Note that, in the above-described embodiment, an example has been described in which the control unit 101 controls the mixing ratios of the vibration signal Sha and the vibration signal Shb in the mixing unit 115 to preset values or values according to a mixing parameter by user operation. However, it is also conceivable that the control unit 101 controls the mixing ratios to the following values. The values obtained by controlling in this manner can also be used, for example, as initial values in a case where the user operation is enabled.

For example, it is conceivable that the control unit 101 controls the mixing ratios to values according to the characteristic of the vibration device 105. In this case, the control unit 101 recognizes the characteristic of the vibration device 105 by automatically determining the type of the vibration device 105 at the time of being connected to the vibration device 105 or the like, or by a user manually inputting the type of the vibration device 105. In this case, the vibration signal Sh can be obtained by mixing the vibration signal Sha and the vibration signal Shb at the mixing ratios suitable for the characteristic of the vibration device 105.

Furthermore, for example, it is conceivable that the control unit 101 controls the mixing ratios to values according to the category of the sound signal SA. In this case, the control unit 101 recognizes which category the sound signal SA belongs to by analyzing the sound signal SA, by metadata or the like belonging to the sound signal SA, or by information manually input by a user. For example, frequency components included in the sound signal SA are analyzed, and the category of the sound signal SA, for example, whether the sound signal SA is a heavy firearm sound type or an environmental sound type is determined on the basis of the analysis result. In this case, the vibration signal Sh can be obtained by mixing the vibration signal Sha and the vibration signal Shb at the mixing ratios suitable for the category of the sound signal SA.

Furthermore, for example, it is conceivable that in a case where there are values set by user operation in the past for the category of the sound signal SA, the control unit 101 controls the mixing ratios to the values. In this case, the vibration signal Sh can be obtained by mixing the vibration signal Sha and the vibration signal Shb at the mixing ratios set by the user operation in the past, and labor of the user operation of setting the mixing ratios can be reduced.

Furthermore, for example, it is conceivable that the control unit 101 controls the mixing ratios to values according to environmental information or user situational information. The environmental information is information indicating, for example, which time period (generally, the nighttime is quieter than the daytime) the environment is in and what type of noise situation the environment has. Furthermore, the user situational information is information indicating a user situation such as age, gender, moving, riding on a train, and the like. In this case, the vibration signal Sh can be obtained by mixing the vibration signal Sha and the vibration signal Shb at the mixing ratios suitable for the environment or the user situation. For example, in a case where it is in the middle of the night, the vibration signal Sh having a ratio of the expressive power-oriented vibration signal Sha larger than that of the intensity-oriented vibration signal Shb can be obtained.

Furthermore, for example, it is conceivable that the control unit 101 controls the mixing ratios to values selected by user operation from a plurality of values held in advance. In this case, associating the plurality of the held values with the type (characteristic) of the vibration device 105, the category of the sound signal SA, the environment, the user situation, and the like allows a user to easily select appropriate values. Note that, although not illustrated, in this case, a selection screen is displayed as a UI screen, and a user selects appropriate values as the mixing ratios on the basis of the selection screen.

Furthermore, in the above-described embodiment, there is no mention of controlling the mixing ratios of the vibration signal Sha and the vibration signal Shb in the mixing unit 115 in time series. However, it is conceivable that the control unit 101 controls the mixing ratios in time series as illustrated in FIG. 25B. FIG. 25A illustrates a waveform of a sound signal. In this case, the control unit 101 controls the mixing ratios in time series on the basis of, for example, preset key frames.

Furthermore, in the above-described embodiment, an example in which the mixing parameter t by user operation is in the range of 0 to 1 has been described (see FIGS. 10A, 10B, and 10C). However, it is also conceivable that the range of the mixing parameter t is set so as to be out of the range of 0 to 1. For example, FIG. 26A illustrates an example in which the range of the mixing parameter t is set to the range of −1 to 2, and FIGS. 26B and 26C illustrate the mixing ratio f(t) of the vibration signal Sha and the mixing ratio 1−f(t) of the vibration signal Shb in that case, respectively.

In this case, in a range in which the mixing parameter t is 0 to −1, the vibration signal Sh includes only the components of the vibration signal Sha, and as the mixing parameter t approaches −1, the intensity (level) of the vibration signal Sha increases. Furthermore, in this case, in a range in which the mixing parameter t is 1 to 2, the vibration signal Sh includes only the components of the vibration signal Shb, and as the mixing parameter t approaches 2, the intensity (level) of the vibration signal Shb increases.

Furthermore, in the above-described embodiment, an example has been described in which the vibration signal generation unit 113 and the vibration signal generation unit 114 are included, and the vibration signals Sha and Shb generated by them are mixed to obtain the vibration signal Sh. However, it is also conceivable that three or more vibration signal generation units having different generation algorithms are included, and vibration signals generated by them are mixed to obtain a vibration signal. Furthermore, it is also conceivable that a plurality of vibration signal generation units is included, and a predetermined number related to mixing, for example, two of the vibration signal generation units can be partially or entirely switched. In this case, the control unit controls selection of the plurality of vibration signal generation units related to mixing of vibration signals.

For example, in addition to a vibration signal generation unit A (for example, the vibration signal generation unit 113) and a vibration signal generation unit B (for example, the vibration signal generation unit 114), a vibration signal generation unit C including, for example, a low-pass filter is included, and the use states of the vibration signal generation units A and B are switched to the use states of the vibration signal generation units A and C. This switching may be manually performed by user operation, or may be automatically performed in a case where the effect of the vibration signal generation unit B is determined to be weak.

Furthermore, in the above-described embodiment, an example in which the operator value of the slider is changed as representation on the UI screen for a user to adjust the mixing parameter t has been described (see FIG. 9), but the present invention is not limited thereto. For example, it is also conceivable that color or transparency is changed as the representation on the UI screen for a user to adjust the mixing parameter t.

Furthermore, although not described above, it is assumed that desired mixing ratios vary depending on a designer, assuming that, in the future, mixing ratios of a plurality of vibration signals to be mixed, such as the mixing ratios of the vibration signal Sha generated by the vibration signal generation unit 113 and the vibration signal Shb generated by the vibration signal generation unit 114, are automatically set. In this case, it is also conceivable that vibration signals that can be produced by a plurality of designers according to individual preference are further mixed to obtain a desired vibration signal. In that case, a user may be able to change the mixing ratios. Note that, in this case, it is also conceivable that mixing ratios selected by a plurality of designers are mixed at mixing ratios desired by a user, and mix a plurality of vibration signals using the mixing ratios obtained by the mixing to obtain a desired vibration signal.

Furthermore, although not described above, it is conceivable that, in a case where a user moves the operator of the slider on the UI screen to change the mixing parameter t, the vibration device is repeatedly vibrated by a short-period sample vibration signal obtained using mixing ratio corresponding to the mixing parameter t at the moving position every time the operator is moved. Therefore, the user can actually feel the moving operation of the operator of the slider.

Furthermore, the preferred embodiment of the present disclosure has been described in detail with reference to the accompanying drawings, but the technical scope of the present disclosure is not limited to such example. It is obvious that a person having ordinary knowledge in the technical field of the present disclosure can conceive various change examples or modification examples within the scope of the technical idea described in the claims, and it is naturally understood that these also belong to the technical scope of the present disclosure.

Furthermore, the effects described in the present specification are merely illustrative or exemplary, and are not limiting. That is, the technology according to the present disclosure can exhibit other effects obvious to those skilled in the art from the description of the present specification together with or instead of the effects described above.

Furthermore, the technology can also have the following configurations.

(1) An information processing device including:
a plurality of haptic signal generation units that generates haptic signals using generation algorithms different from each other; and
a mixing unit that mixes haptic signals generated by at least two of the plurality of haptic signal generation units to obtain an output haptic signal.

(2) The information processing device according to the (1) further including
a control unit that controls mixing ratios of the mixing unit.

(3) The information processing device according to the (2), in which
the control unit controls the mixing ratios to preset values.

(4) The information processing device according to the (2), in which
the control unit controls the mixing ratios to values according to a mixing parameter by user operation.

(5) The information processing device according to the (2), in which
the control unit controls the mixing ratios to values according to a characteristic of a haptic device that presents haptic sensation by the output haptic signal.

(6) The information processing device according to the (2), in which
the plurality of haptic signal generation units generates the haptic signal on the basis of a sound signal, and
the control unit controls the mixing ratios to values according to a category of the sound signal.

(7) The information processing device according to the (6), in which
the control unit controls the mixing ratios to values set by user operation in a past for a category of the sound signal in a case where said values exist.

(8) The information processing device according to the (2), in which
the control unit controls the mixing ratios in time series.

(9) The information processing device according to the (8), in which
the control unit controls the mixing ratios in time series on the basis of preset key frames.

(10) The information processing device according to the (2), in which the control unit controls the mixing ratios to values according to environmental information.

(11) The information processing device according to the (2), in which the control unit controls the mixing ratios to values according to user situational information.

(12) The information processing device according to the (2), in which the control unit controls the mixing ratios to values selected by user operation from a plurality of held values.

(13) The information processing device according to any one of the (2) to (12), in which the control unit further controls selection of the plurality of haptic signal generation units related to mixing of haptic signals.

(14) The information processing device according to any one of the (2) to (13), in which the control unit controls a value of at least one internal parameter of the plurality of haptic signal generation units related to mixing of haptic signals, in addition to control of mixing ratios in the mixing unit.

(15) The information processing device according to any one of the (1) to (14), in which each of the plurality of haptic signal generation units related to mixing of haptic signals outputs an envelope signal instead of a haptic signal including a sine wave of a predetermined frequency, and the mixing unit multiplies a signal obtained by mixing envelope signals output from the plurality of haptic signal generation units related to mixing of haptic signals by a sine wave of the predetermined frequency to obtain the output haptic signal including a sine wave of the predetermined frequency.

(16) The information processing device according to any one of the (1) to (14), in which the mixing unit converts haptic signals output from the plurality of haptic signal generation units related to mixing of haptic signals to a frequency domain, mixes the signals, and converts the signals obtained by mixing to a time domain to obtain the output haptic signal.

(17) The information processing device according to any one of the (1) to (16) further including a post-processing unit that performs processing of normalization or clipping on the output haptic signal obtained by the mixing unit.

(18) The information processing device according to any one of the (1) to (5) or (8) to (17), in which the plurality of haptic signal generation units generates the haptic signal on the basis of a sound signal.

(19) An information processing method including:

generating a plurality of haptic signals using generation algorithms different from each other; and mixing at least two of the plurality of haptic signals to obtain an output haptic signal.

REFERENCE SIGNS LIST

10 Haptic signal generation device
101 Control unit
102 User operation unit
103 Display unit
104 Processing unit
105 Vibration device
106 Sound output unit
111 Sound signal storage unit
112 Sound signal processing unit
113, 114 Vibration signal generation unit
115 Mixing unit
116 Vibration signal processing unit
117 Vibration signal storage unit
301 Attack segment detection unit
302 High frequency band detection unit
303 Sine wave A conversion unit
304 Low frequency band detection unit
305 Sine wave B conversion unit
306 High frequency band extraction unit
307 Pitch shift unit
308 Low frequency band extraction unit
309 Addition unit
310 Dynamics compression unit
311 Addition unit
401 Attack segment detection unit
402 Segment extension unit
403 Sine wave conversion unit
404 High frequency band extraction unit
405 Pitch shift unit
406 Low frequency band extraction unit
407 Addition unit
408 Dynamics extension unit
409 Addition unit
511 Operation unit
512 First waveform display unit
513 Second waveform display unit
611 Operation unit
612 First waveform display unit
613 Second waveform display unit

The invention claimed is:

1. An information processing device, comprising:
a plurality of haptic signal generation units, wherein
a haptic signal generation unit of the plurality of haptic signal generation units is configured to generate a haptic signal of a plurality of haptic signals,
the haptic signal generation unit is associated with a generation algorithm of a plurality of generation algorithms, and
the haptic signal is generated based on at least one internal parameter of the haptic signal generation unit and the generation algorithm associated with the haptic signal generation unit;
a control unit configured to:
control mixing ratios of a mixing unit; and
control a value of the at least one internal parameter based on the mixing ratios; and
the mixing unit configured to:
mix, based on the mixing ratios, at least two haptic signals of the plurality of haptic signals generated by at least two of the plurality of haptic signal generation units; and
obtain an output haptic signal based on the mixed at least two haptic signals of the plurality of haptic signals.

2. The information processing device according to claim 1, wherein the control unit is further configured to control the mixing ratios based on preset values.

3. The information processing device according to claim 1, wherein
the control unit is further configured to control the mixing ratios based on a mixing parameter, and
the mixing parameter is based on a user operation.

4. The information processing device according to claim 1, wherein
the control unit is further configured to control the mixing ratios based on a characteristic of a haptic device, and the haptic device presents haptic sensation based on the output haptic signal.

5. The information processing device according to claim 1, wherein
the haptic signal generation unit is further configured to generate the haptic signal based on a sound signal, and
the control unit is further configured to control the mixing ratios based on a category of the sound signal.

6. The information processing device according to claim 5, wherein
the control unit is further configured to control the mixing ratios based on a user operation in a past for the category of the sound signal.

7. The information processing device according to claim 1, wherein the control unit is further configured to control the mixing ratios in time series.

8. The information processing device according to claim 7, wherein the control unit is further configured to control the mixing ratios in the time series based on preset key frames.

9. The information processing device according to claim 1, wherein the control unit is further configured to control the mixing ratios based on environmental information.

10. The information processing device according to claim 1, wherein the control unit is further configured to control the mixing ratios based on user situational information.

11. The information processing device according to claim 1, wherein
the control unit is further configured to control the mixing ratios based on specific values, and
the specific values are selected based on a user operation from a plurality of held values.

12. The information processing device according to claim 1, wherein the control unit is further configured to control selection of the plurality of haptic signal generation units.

13. The information processing device according to claim 1, wherein
each of the plurality of haptic signal generation units is further configured to output an envelope signal of a plurality of envelope signals instead of a respective haptic signal of the plurality of haptic signals,
wherein the respective haptic signal includes a sine wave of a frequency, and
the mixing unit is further configured to:
mix the plurality of envelope signals;
multiply the mixed plurality of envelope signals by the sine wave of the frequency; and
obtain the output haptic signal based on the multiplication,
wherein the output haptic signal includes the sine wave of the frequency.

14. The information processing device according to claim 1, wherein
the mixing unit is further configured to:
convert the plurality of haptic signals into a plurality of frequency domain signals;
mix the plurality of frequency domain signals;
convert the mixed plurality of frequency domain signals into a time domain signal; and
obtain the output haptic signal based on the time domain signal.

15. The information processing device according to claim 1 further comprising a post-processing unit configured to one of normalize or clip the output haptic signal.

16. The information processing device according to claim 1, wherein the haptic signal generation unit is further configured to generate the haptic signal based on a sound signal.

17. An information processing method, comprising:
generating a haptic signal of a plurality of haptic signals, wherein the haptic signal is generated based on at least one internal parameter of a haptic signal generation unit and a generation algorithm associated with the haptic signal generation unit;
controlling mixing ratios of at least two haptic signals of the plurality of haptic signals;
controlling a value of the at least one internal parameter based on the mixing ratios;
mixing, based on the mixing ratios, the at least two haptic signals of the plurality of haptic signals; and
obtaining an output haptic signal based on the mixed at least two haptic signals of the plurality of haptic signals.

* * * * *